Patented Aug. 18, 1931

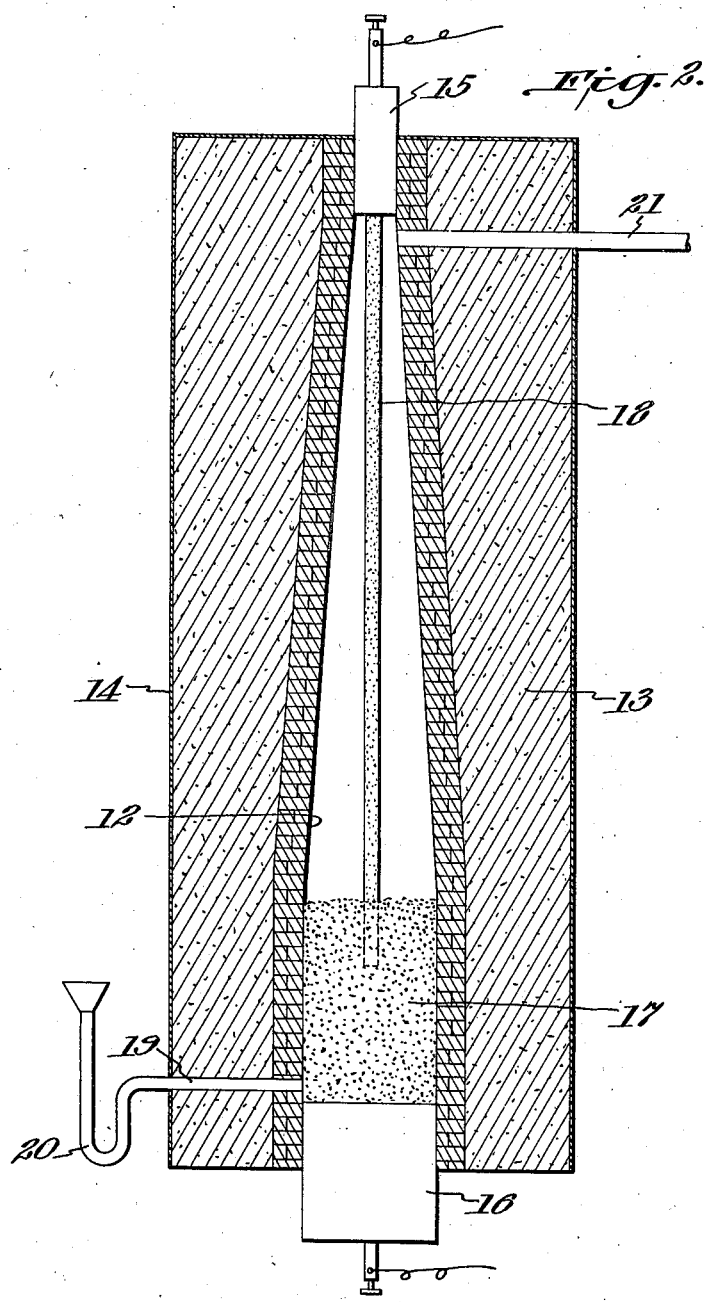

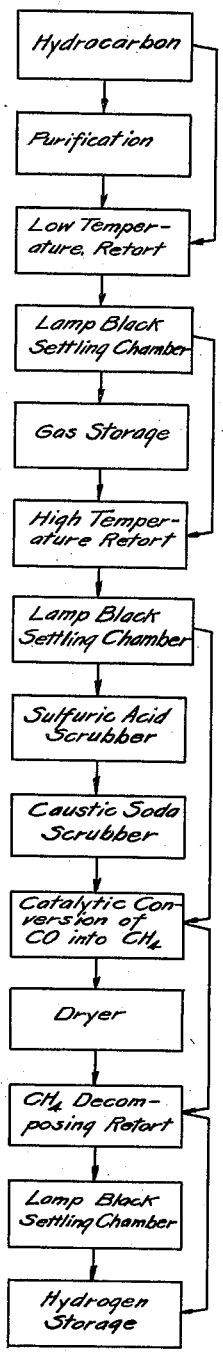

1,819,732

UNITED STATES PATENT OFFICE

ARTHUR W. BURWELL, OF NIAGARA FALLS, NEW YORK, ASSIGNOR TO ALOX CHEMICAL CORPORATION, OF NEW YORK, N. Y., A CORPORATION OF NEW YORK

PROCESS FOR THE PRODUCTION OF HYDROGEN AND CARBON FROM HYDROCARBONS

Application filed September 16, 1925. Serial No. 56,772.

An object of the present invention is the provision of a process and a suitable apparatus for its execution for the commercial production of hydrogen in pure form suitable for use for instance in the synthesis of ammonia, and carbon in the form of lampblack as a valuable by-product from hydrocarbons such as petroleum oil, fuel oil, natural gas, casing head gas and the like. Hydrogen for use in the synthesis of ammonia must be substantially free of hydrocarbons and carbon monoxide.

In the investigation of this matter the following observations have been made:

When petroleum or other hydrocarbon vapor is heated to high temperatures for instance by being passed through a heated tube or over heated surfaces, it is more or less completely decomposed into its elements, carbon and hydrogen, the decomposition being complete or substantially complete if the temperature is sufficiently high. Up to certain temperatures no reaction takes place. As the temperature is gradually increased large hydrocarbon molecules if present begin to break up into smaller molecules some of which are saturated and some unsaturated and small amounts of hydrogen may be liberated. At still higher temperatures the breaking up of the hydrocarbons proceeds further with the formation of methane, a greater proportion of smaller unsaturated hydrocarbons and some hydrogen. A further increase in temperature results in the formation of ring compounds such as benzol, toluol and their homologues, naphthalene, anthracene, phenanthrene, picene and many substituted bodies derived therefrom with a further increase in the amount of hydrogen liberated. Up to this point very little elemental carbon is formed. Now as the temperature is further increased the liberation of carbon begins with a further increase in the liberation of hydrogen accompanied first by a reduction in the proportion of unsaturated bodies present in the gas followed by a reduction in the proportion of aliphatic hydrocarbon bodies both saturated and unsaturated present in the gas and finally by the disappearance of the aromatic bodies until at a sufficiently high temperature only the two ultimate decomposition products, hydrogen and carbon, remain. There are of course some variations to the progress of the decomposition outlined above, for instance if the rise in temperature of the hydrocarbon vapor is rapid, the proportions of hydrogen and carbon to the other bodies formed at a given temperature is greater than when the same temperature is arrived at by a more gradual rise in temperature.

One method heretofore commonly employed for completing the decomposition of the hydrocarbons is by the use of high temperatures approaching the melting point of iron and oxidizing agents such as air, oxygen or steam introduced into the hydrocarbon vapor under treatment. Such use of oxidizing agents promotes the decomposition of the hydrocarbons giving a gaseous product free of hydrocarbons but has the disadvantage that carbon monoxide, a very objectionable impurity and one which is very difficult to remove, is formed. The process of my invention differs from such prior methods of producing hydrogen from hydrocarbons in that no oxidizing agents are used and a feature of my invention resides in the exclusion so far as is practicable of all oxidizing influences. To this end I not only use hydrocarbons or mixtures which are free of oxygen compounds either naturally or as a result of suitable preliminary treatment, but also carefully guard against any accidental or incidental admission of oxygen to the gas under treatment for instance in the form of water or steam or atmospheric air and even from iron rust on the retort walls. Any oxygen present in the gas under treatment will appear in the gaseous product in the form of carbon monoxide which, as stated, is a detrimental impurity and very difficult to eliminate. Natural gas and the light ends of casing head gasoline may be obtained substantially free of oxygen or oxygen compounds, but petroleum oil ordinarily contains absorbed oxygen and oxygen compounds which must be removed by a preliminary treatment for instance as follows. The oil or other hydrocarbon mixture such as Pennsylvania crude oil is treated with sulfuric acid of about 66° Bé., about five pounds of acid to a barrel of oil, according to the usual method of refining oil with sulfuric acid, then washed with water and finally with dilute alkali and finally dried by heating. Such a treatment will remove free and combined oxygen as well as water. The oxygen free oil must then be handled so that it is introduced into the decomposing apparatus without being mixed with or absorbing water or oxygen from the air or any other oxidizing agent.

There are two possible methods of treating the hydrocarbon (1) by subjecting it to such heat treatment as to accomplish a substantially complete decomposition, and (2) by subjecting the hydrocarbon to partial decomposition by the employment of lower temperatures and then removing residual hydrocarbons from the hydrogen gas by a suitable procedure such as compression, refrigeration, and if desired or necessary, finally scrubbing the hydrogen gas with a high boiling wash oil of low or negligible volatility. The process may also be operated either so that the liberated carbon will be deposited in massive form or in the form of lampblack as will appear hereinafter, the operation of the process so that the carbon is recovered wholly or largely in the form of lampblack being preferred.

The heating of the hydrocarbon preferably is accomplished by passing it in the form of gas or vapor through a tubular retort. Two forms of retorts suitable for this purpose are illustrated in the accompanying drawings in which:

Fig. 2 is a vertical section of a retort designed to be heated electrically; and Fig. 3 is a flow sheet of my preferred process.

Figure 1:
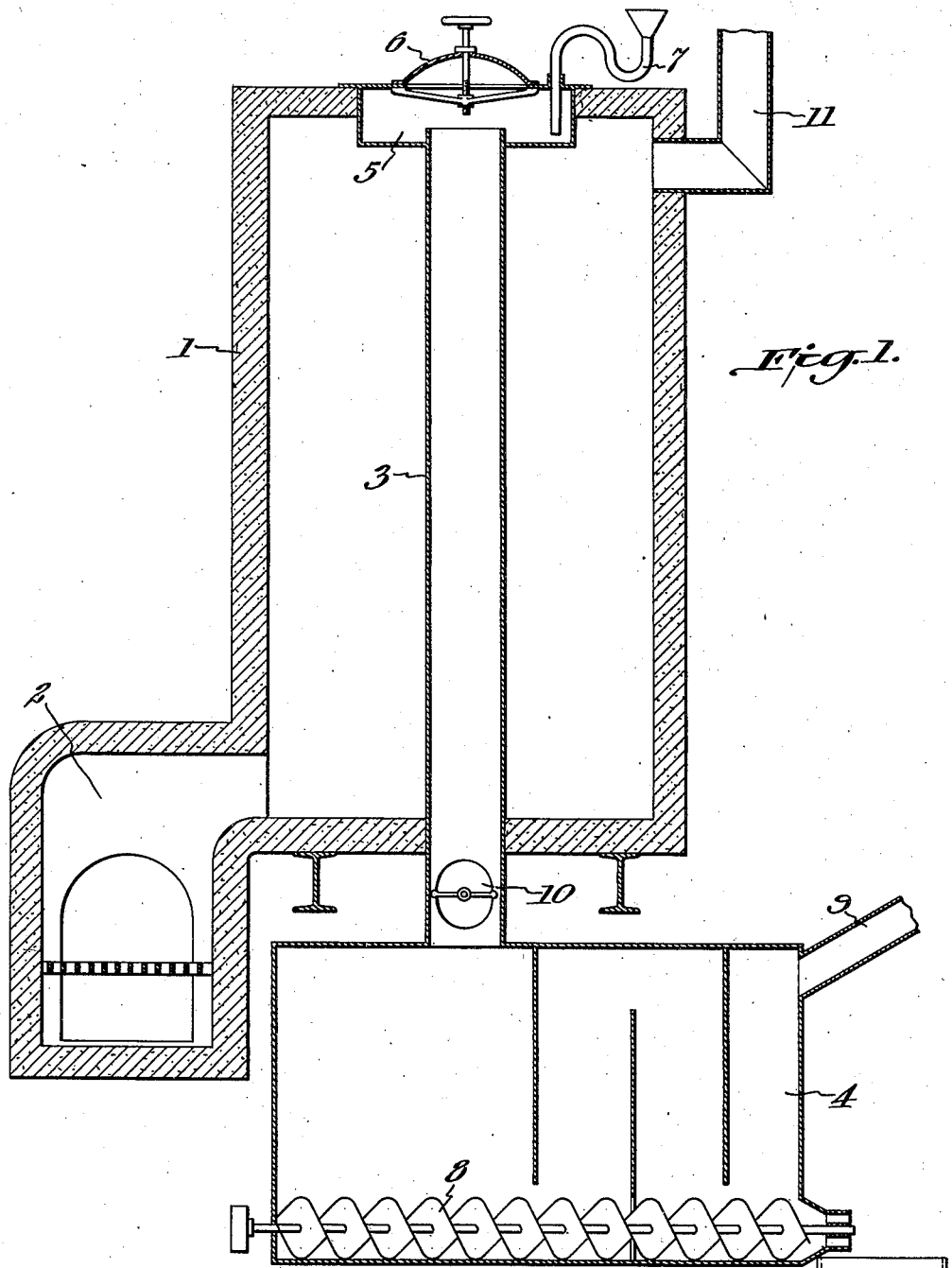
Fig. 1 is a vertical sectional view of a retort designed to be heated by fire gases.

Referring to Fig. 1, 1 is the retort housing of fire brick, 2 a furnace, 3 the retort tube which may be of cast iron or earthenware or other suitable refractory material, and 4 is a baffle chamber for separating carbon black from the hydrogen gas. The upper end of the retort tube 3 opens into an oil vaporizing chamber 5 having a removable closure 6 and the lower end of the retort tube communicates with the lampblack chamber 4. Hydrocarbon oil is supplied to the chamber 5 through the goose neck 7 which forms a seal and prevents the escape of gas. Lampblack is removed from the baffle chamber by means of the screw conveyor 8 and the hydrogen gas is delivered to storage or to apparatus for its purification through the outlet pipe 9. 10 is a door which may be opened to admit air to the retort while it is being cleaned, but is kept closed during the operation of the hydrocarbon decomposing process, and 11 is the outlet flue for the waste heating gases from the furnace 2. As illustrated, the retort tube stands vertically, this being preferred to eliminate as far as possible the deposition of carbon in the retort and to facilitate the cleaning of the retort, but the vertical arrangement of the retort is not essential. It may be arranged horizontally or slantingly. The retort illustrated in Fig. 1 may be heated by means of a coal, coke, gas or oil fire, or the retort may be heated electrically as illustrated in Fig. 2.

The hydrocarbon may be supplied to the the retort in any suitable form and manner, for instance in the form of a gas, vapor, liquid or solid, one method being illustrated in Fig. 1, according to which an oil is delivered in liquid form into a vaporizing chamber heated by fire gases from the retort heating furnace, the resulting oil vapors passing directly into the retort.

Referring to Fig. 2, 12 is the retort tube made of suitable material such as fire brick, 13 is a covering of heat insulating material, and 14 a metallic shell to make the retort gas tight. 15 and 16 are electrodes, 17 a mass of broken carbon and 18 a carbon rod resistor. The retort is heated by the passage of current between the electrodes 15 and 16 through the mass of broken carbon 17 and the carbon resistor 18. Hydrocarbon oil or gas is supplied through the pipe 19 having a liquid seal 20 to prevent the escape of gas and the hydrogen and lampblack formed leave the retort through the outlet 21 passing to apparatus for the recovery of lampblack and then to storage or a place of use or apparatus for the further purification of the gas. When oil is supplied through the pipe 19, it is vaporized by contact with the hot broken carbon mass 17 and the resulting vapors pass upward through the retort tube where the decomposition into hydrogen and carbon takes place. Whether the carbon is deposited in the retort or carried out of the retort in the form of lampblack, or both, depends largely upon the rate of decomposition of the hydrocarbon, which in turn depends upon the rate at which the temperature of the hydrocarbon is raised and upon the speed of movement of the gases. In general a rapid heating and rapid movement of the gases favor the production of lampblack. Due to the practical difficulties involved in the removal of carbon from the retort and further due to the fact that lampblack is a salable product, conditions favoring the maximum production of lampblack and a minimum deposition of carbon in the retort are preferred. It is further observed that the more quickly the lampblack is removed from the retort the better is the quality of lampblack produced.

In addition to the observation that the presence of an oxidizing agent such as steam or air is not necessary but is actually detrimental in the decomposition of hydrocarbons for the production of pure hydrogen, I have further observed that the employment of high temperatures approaching the melting point of iron in order to bring about a complete decomposition is neither necessary nor desirable. I have found that by heating the hydrocarbon with careful exclusion of oxidizing agents to a temperature of about 1150 to 1160° C. a gas containing 99.1% of hydrogen and as low as 0.2% of methane and 0.7% of carbon monoxide may be produced directly. Even at a temperature as low as 1000° C. a gas containing as little as 1% of methane and practically free of carbon monoxide, the remainder being hydrogen, may be produced. The temperatures referred to are measured by means of a platinum-rhodium thermocouple in the heated space just outside of the retort tube.

These observations have led to the development of my preferred procedure illustrated on the accompanying flow sheet (Fig. 3) to be described hereinafter. According to my preferred procedure hydrocarbon or mixtures of hydrocarbons substantially free of oxygen or oxygen compounds is decomposed in two stages preferably using two separate retorts which may be identical in construction, each stage being followed by a separation of lampblack, and if desired a subsequent treatment of the hydrogen gas for removal of any undecomposed hydrocarbons and carbon monoxide.

The hydrocarbon is first purified if necessary for the removal of oxygen and is delivered into the first of the two retorts referred to hereafter as the low temperature retort. This retort is operated so as to decompose the bulk of the hydrocarbon, producing a gas consisting mainly of hydrogen with small amounts of unsaturated and aromatic bodies and a somewhat larger amount of methane. A temperature of 950 to 1000° C. in the first retort is suitable for this purpose and gives an excellent quality of lampblack. If the retort is too long or the gas is passed too slowly through it, a considerable amount of carbon will be deposited in the retort. This is objectionable not only because it renders the cleaning of the retort necessary but the quality of the carbon so produced is inferior.

By observation the operator of any particular retort may readily determine the speed at which the hydrocarbon should be supplied to get the desired results. As a general rule which may serve as a guide, I have found that the production of two cubic feet of gas each 24 hours for each square inch of heating surface on the inside of the retort gives good results. Considerable variation from the rule, depending upon the size and shape of the retort, the kind of hydrocarbon under treatment and whether it is supplied to the retort in liquid or in gaseous form, and possibly other variable conditions, probably will be necessary. The mixed gases and carbon dust leaving the first retort are passed through a lampblack settling chamber and the separated gases are delivered either to a gas holder which should be set in oil to guard against the contamination of the gas with air or water, and then to the second retort, or directly to the second or high temperature retort. The second retort is operated at a temperature of say 1140° to 1170° C. This temperature insures the rapid and complete decomposition of the hydrocarbons and at the same time is sufficiently low so that it insures a long life for the retort. It is noted here with reference to the temperatures specified that the decomposition of the hydrocarbon with a good yield of gas may be accomplished at temperatures of from 850° to 950° C. but the quality of the lampblack formed at this temperature is not so good. Moreover, when the first retort is operated at this low temperature and the resulting gas after passing through the lampblack chamber is heated in the second retort to the rapid decomposition temperature of the residual hydrocarbons, there is danger of melting the second retort. This may be explained by the theory that the heating in the first retort followed by the cooling incident to the removal of the lampblack forms hydrocarbon bodies which on being heated to their decomposition temperature decompose suddenly or explosively with the liberation of a large amount of heat. This decomposition and liberation of heat is localized in the second retort and causes the retort to give way at the particular point at which the decomposition temperature of the hydrocarbons is reached. The use of a slightly higher temperature, i. e. 950° to 1000° C., in the first retort for some reason avoids these difficulties, perhaps because the hydrocarbons formed at the higher temperature do not, upon cooling in the lampblack chamber, form the endothermic bodies referred to or because they are formed in smaller amounts.

If hydrocarbons are decomposed at temperatures between 850° C. and say 950° C. there will be formed endothermic bodies in such quantity that on further heating in iron or other not sufficiently refractory retorts, the amount of heat evolved added to the temperature already maintained may bring the temperature to such a point that the retort will be damaged or destroyed. If, however, the retort be made of a material sufficiently refractory then the high temperature may be made useful in that it will aid in the decomposition of the more difficultly decomposable hydrocarbons such as methane. It thus becomes possible to so select and maintain the temperature of the first retort that by merely maintaining what may be termed a kindling temperature in the second retort a maximum of decomposition will take place.

It is known that at a sufficiently high degree of heat it is possible to completely decompose methane into its elements. Such temperatures are so high that in many cases the retorts are rapidly destroyed. However, I may employ another method of freeing hydrogen containing small amounts of methane from that gas. Methane like other aliphatic hydrocarbons at certain temperatures is decomposed or partly decomposed with the formation of other hydrocarbons of higher molecular weight. I have caused the following reactions to take place:

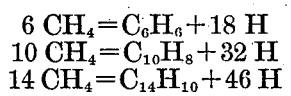

$$6\ CH_4 = C_6H_6 + 18\ H$$
$$10\ CH_4 = C_{10}H_8 + 32\ H$$
$$14\ CH_4 = C_{14}H_{10} + 46\ H$$

I find the best temperature for the above reactions lies somewhere between 1030° and 1130° C. At higher temperatures even these bodies are decomposed with the formation of some hydrogen, some carbon, and, in the presence of large quantities of hydrogen, of considerable amounts of methane.

I have found it possible to so regulate the rate of flow of gases and the temperature that all methane is decomposed and with the deposition of very little carbon. The aromatic hydrocarbons formed can be very easily removed leaving the hydrogen pure.

The gas leaving the second retort is then passed through the second lampblack settling chamber. The resulting gas is of sufficient purity for many purposes and may be used directly, but since it may contain a relatively very small amount of carbon monoxide, it being practically impossible to exclude all oxygen and it may also contain small amounts of hydrocarbons, it may be desirable to purify it. I have found that at 1700° C. carbon monoxide decomposes into carbon and carbon dioxide both of which are readily removed from the hydrogen gas, but I prefer to remove the carbon monoxide by passing the gas over a suitable catalyst such as metallic nickel when the carbon monoxide and hydrogen react as follows:

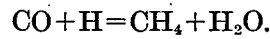

$$CO + H = CH_4 + H_2O.$$

The water may be removed by the use of a dehydrating agent such as calcium chloride or sulfuric acid and the methane may be decomposed by a high temperature treatment similar to the treatment of the hydrocarbon described above. On the flow sheet, Fig. 3, I have illustrated a complete purifying process which consists in first scrubbing the gas with sulfuric acid to remove any unsaturated and aromatic bodies which are more apt to be present if the retort treatment of the gas has been carried out at a low temperature. The gas is then scrubbed with caustic soda to remove any acid spray and then passed over the metal catalyst as described above, then dried by means of sulfuric acid, silica gel, phosphorus pentoxide or the like, then passed through a retort to decompose the methane and finally it may be passed through a lampblack settling chamber to remove carbon although this is usually unnecessary because of the very small amount of carbon present.

It is to be understood that my invention and the patent protection solicited are not limited to the complete process or to all of the details thereof which have been described except as may be required by the appended claim. Certain steps or combinations of steps of the complete process described may be used by themselves or in relations other than those described and such steps or combinations of steps therefore are to be regarded as my invention and subject to my patent protection.

I claim:

Process which comprises treating a petroleum oil with sulfuric acid and with alkali and subsequently drying the treated oil, whereby the oil is substantially completely freed of oxygen and oxygen compounds, and passing the resulting oxygen-free oil in vapor form into contact with a solid body heated to a temperature of from about 850° to about 1170° C.

In testimony whereof, I affix my signature.

ARTHUR W. BURWELL.